Aug. 12, 1941.   C. J. SIMKO ET AL   2,252,583
DEVICE TO INCREASE DEPTH-SHARPNESS AND CLEARNESS OF PHOTOGRAPHS
Filed Sept. 7, 1939
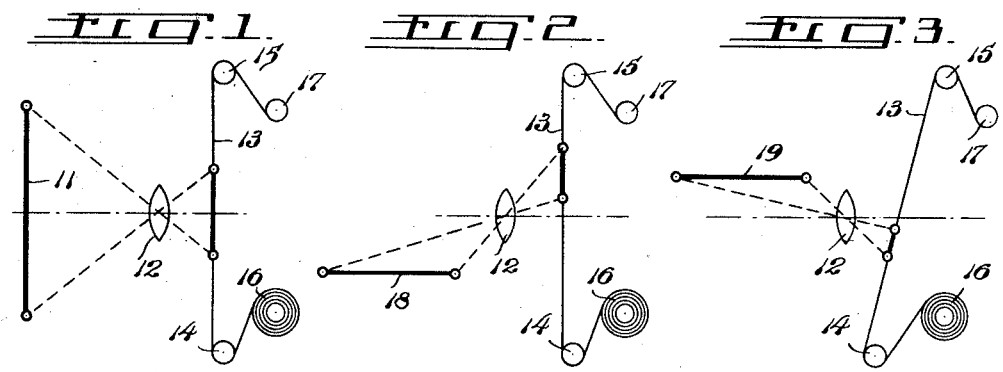
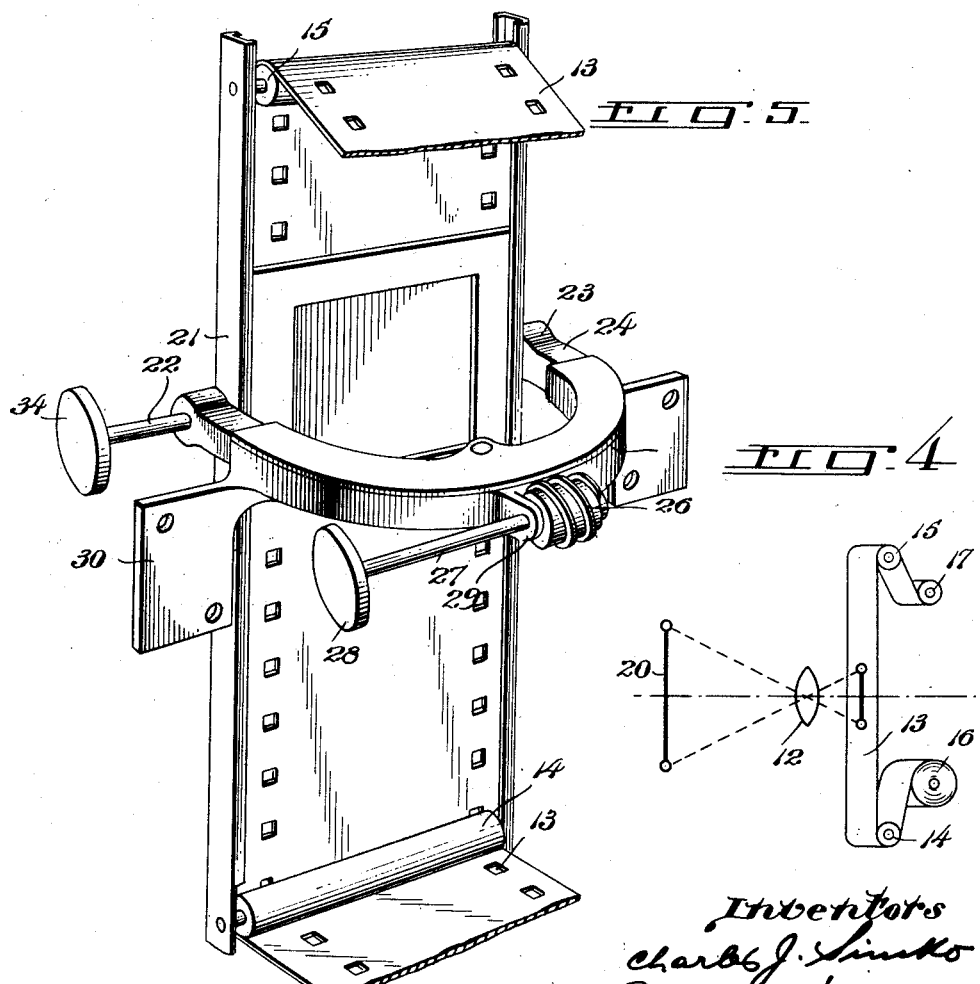

Patented Aug. 12, 1941

2,252,583

UNITED STATES PATENT OFFICE 2,252,583

DEVICE TO INCREASE DEPTH-SHARPNESS AND CLEARNESS OF PHOTOGRAPHS

Charles J. Simko and Ferdinand Szolinger, Chicago, Ill.

Application September 7, 1939, Serial No. 293,718.

1 Claim. (Cl. 88—16.6)

This invention relates to photograph cameras and is intended to improve the proportion, depth-sharpness and clearness of pictures taken while the lens of the camera is kept completely open.

Moving picture cameras used at present are not able to produce pictures with open lens showing complete depth-sharpness and clearness of all details; while the partial depth-sharpness and clearness, which may be produced with them, involve such immense expenses for reflectors and electric current that are out of proportion compared with the results obtained.

In moving picture cameras, used at present, the optic axis of the lens and the plane of the film are usually disposed rectangularly to each other, which means that the relative position of the two and thereby the proportion of the object and the picture is fixed; consequently all pictures made with said fixed relative position and proportion cannot be of equal depth-sharpness and clearness, because the only variation they contain is produced by the intermittent movement of the film in a plane disposed normally to the axis of the lens.

The fixed relative position of the axis of the lens and of the plane of the film makes it impossible to vary the proportion of the object and the picture, which variation is necessary to obtain pictures, showing depth-sharpness and clearness of all details.

In the human eye, the lens and the ball-like retina move simultaneously toward the object and produce in combination with the continuous variability of the short focal distance of the lens of the eye the phenomenon of depth-sharpness which promotes clearness.

In moving picture cameras, the phenomenon of depth-sharpness is reduced, due to the great focal distance of the lens and the strong artificial lights acting upon the normally disposed plane of the film, which disposition distorts the proportion of the picture because the parts situated closer to the lens appear larger, while the parts located farther from the lens appear smaller.

The above stated facts lead to the conclusion that a film picture will approach the ideal conditions to the extent as the location of the film approximates the disposition of the retina.

An improvement in film pictures may consequently be obtained if the fixed relative position existing at present between the axis of the lens and the normally disposed plane of the film is so constructed, that it permits a limited degree of rotation of the film around its central-horizontal and vertical axes; through such a construction, the space wherein the picture is formed obtains a third dimension and becomes a picture-prism, while up to the present it is only a picture plane, due to the normal disposition of the plane of the film relative to the optic axis of the lens.

The smaller said picture prism, the more it will approximate the condition existing in the human eye.

At present there exist moving picture cameras which permit a variation of the relative position existing between the optic axis of the lens and the plane of the film in one direction.

Said one directional rotability requires iris adjustments, and necessitates the application of strong artificial lights.

The object of this invention is a device permitting a limited degree of rotation of the film around its central horizontal and vertical axes, whereby the normal relative position existing between the axis of the lens and the plane of the film may be varied within certain limits.

Another object of this invention is the construction of a device permitting to a limited degree variations of the angle existing between the axis of the lens and the plane of the film.

A still further object of this invention is to correct the distortion of the picture by disposing the plane of the film into the most opportune position relative to the optic axis of the lens, thereby increasing depth-sharpness and clearness of the pictures.

Fig. 1 schematically illustrates an object projected through a lens upon a film, disposed in a normal plane relative to the axis of the lens.

Fig. 2 schematically illustrates the distortion showing on a film disposed in a plane normal to the axis of the lens.

Fig. 3 schematically illustrates the position of the film relative to the optic axis of the lens in case the plane of the film is slightly rotated around its central-horizontal axis.

Fig. 4 schematically illustrates the position of the film relative to the optic axis of the lens in case the plane of the film is slightly rotated around its central-vertical axis.

Fig. 5 illustrates an assembly of the film adjusting device.

With the foregoing and other objects in view, which will appear as the description proceeds, the invention consists in certain new features of construction and arrangements of parts hereinafter more fully described, illustrated in the accompanying drawing, and particularly pointed out in the appended claim; it being understood that various changes in the form, proportion, size and quantity of minor details of the structure may be made without departing from the spirit or sacrificing any of the advantages of the invention.

For the purpose of facilitating an understanding of the invention, we have illustrated in the accompanying drawing a schematic layout of the assembly and a preferred embodiment thereof, from an inspection of which, when considered in connection with the following description, the invention, its mode of construction and assembly, and many of its advantages, will be readily understood and appreciated.

Referring to the drawing, in which similar characters of reference are employed to indicate corresponding parts throughout the several figures of the drawing:

In Fig. 1, a vertical object 11, is projected through the lens 12, upon film 13, said film 13, being disposed, by means of roller-guides 14, and 15, and film supports 16, and 17, in a normal plane of the axis of the lens.

In Fig. 2, a horizontal object 18, is projected through the lens 12, upon film 13, showing the distortion resulting from such normal relative positions of lens-axis and film-plane.

In Fig. 3, a horizontal object 19, is projected through the lens 12, upon film 13, said film 13, being partially rotated around the central-horizontal axis.

In Fig. 4, a vertical object 20, is projected through the lens 12, upon film 13, the plane of said film being partially rotated around its central-vertical axis.

In Fig. 5, the incoming film 13, is guided over the lower roller-guide 14, into a film-holder 21; the film 13, while it passes through said holder 21, in front of the lens 12, is kept in a plane until it reaches the upper roller-guide 15. Said film-holder 21, is suitably built to permit limited rotations around its central-horizontal and vertical axes, and to hold said film 13, securely in the desired position; to achieve this, two parts 22, forming a horizontal axle, are rigidly connected to the lateral wall of the film-holder 21.

The horizontal axle 22, is supported in bearings 23. To one end of the horizontal axle 22, a knob 34 is attached; by turning said knob 34, the film-holder 21, the roller-guides 14, and 15, and the film 13, situated between said roller-guides 14, and 15, turn around the central-horizontal axis represented by the two portions of axle 22. The bearing holder 24, is of semi-circular shape and is rotatably disposed within a covered semi-circular trough 25. By means of a worm-gear 26, attached to the outside wall of the semi-circular trough 25, said bearing holder 24, may be slightly rotated around its central vertical axis. The axle 27, of the worm-gear 26, is supported by bearing surfaces 29, and has at its end a knob 28, by means of which the slight rotation around the vertical axis is performed. The semi-circular trough 25, is rigidly connected with supporting plates 30, which are fastened to the wall of the camera.

From Fig. 5, it is clear that the turning of knob 34, accomplishes a limited rotation of the film around its horizontal axis, while the turning of knob 28, will result in a slight rotation around the vertical axis of the film.

We claim:

A device to increase depth-sharpness and clearness of photographs by means of varying the relative position between the optic axis of the lens and the normal plane of the film; said means comprise a horizontal axle composed of two portions, and rigidly connected to them is the film-holder, said two portions of the horizontal axle are supported by two bearings, said construction permits a limited forward and backward rotation of the film-plane; said two bearings are disposed at the ends of a semi-circular supporting bar, which is disposed within a semi-circular trough, said semi-circular supporting bar being slightly rotatable within said semi-circular trough by means of a worm-gear, said worm-gear is disposed in the outer wall of the semi-circular trough, said semi-circular trough possesses two supporting plates which are fastened by any known means to the wall of the camera.

CHARLES J. SIMKO.
FERDINAND SZOLINGER.